US009389628B2

(12) United States Patent  (10) Patent No.: US 9,389,628 B2
Herbison  (45) Date of Patent: Jul. 12, 2016

(54) DIGITALLY CONTROLLED BUCK-BOOST REGULATOR HAVING A CUSTOM MAPPING CONTROLLER

(71) Applicant: Intel Mobile Communications GmbH, Neubiberg (DE)

(72) Inventor: David Herbison, Munich (DE)

(73) Assignee: Intel Deutschland GmbH, Neubiberg (DE)

( * ) Notice: Subject to any disclaimer, the term of this patent is extended or adjusted under 35 U.S.C. 154(b) by 395 days.

(21) Appl. No.: 13/794,902

(22) Filed: Mar. 12, 2013

(65) Prior Publication Data

US 2013/0278232 A1  Oct. 24, 2013

Related U.S. Application Data

(60) Provisional application No. 61/636,130, filed on Apr. 20, 2012.

(51) Int. Cl.
*G05F 1/00* (2006.01)
*G05F 1/62* (2006.01)
*H02M 3/156* (2006.01)
(Continued)

(52) U.S. Cl.
CPC ............... *G05F 1/62* (2013.01); *H02M 3/156* (2013.01); *H02M 3/157* (2013.01); *H02M 3/1582* (2013.01); *H02M 3/1588* (2013.01)

(58) Field of Classification Search
CPC .............. G05F 1/10; G05F 1/46; G05F 1/56; G05F 1/565; G05F 1/575; H02M 3/155; H02M 3/156; H02M 3/157; H02M 3/158
USPC ........................... 323/234, 237, 265, 282–285
See application file for complete search history.

(56) References Cited

U.S. PATENT DOCUMENTS 6,037,755 A  3/2000  Mao et al.
7,130,346 B2 * 10/2006  Midya et al. .................. 375/238
8,305,061 B1  11/2012  Zhang et al.
(Continued)

FOREIGN PATENT DOCUMENTS

CN  1354554 A  6/2002
EP  1715571 A2  10/2006

OTHER PUBLICATIONS

Office Action dated Jun. 12, 2014 in connection with German Patent Application No. 10 2013 104 066.7, p. 1-8.
(Continued)

*Primary Examiner* — Jeffrey Gblende
(74) *Attorney, Agent, or Firm* — Eschweiler & Associates, LLC (57) ABSTRACT

A digitally controlled buck boost regulator includes an H-bridge circuit including a plurality of switches configured to receive an input voltage signal and generate an output voltage signal based on the input voltage signal and switching signals provided thereto. A controller generates a pulse width modulation (PWM) control value in response to a value of the output voltage signal, and a quantizer/mapper receives the PWM control value and provides a first mapping to a mapped PWM control value if the PWM control value is outside a predetermined range of PWM control values, and generates a second mapping to a mapped PWM control value if the PWM control value is within the predetermined range. A digital pulse width modulator is configured to generate switching signals based on the mapped PWM control value, and provide the generated switching signals to the H-bridge circuit.

14 Claims, 6 Drawing Sheets

(51) Int. Cl.
*H02M 3/157* (2006.01)
*H02M 3/158* (2006.01)

(56) References Cited

U.S. PATENT DOCUMENTS

| | | | |
|---|---|---|---|
| 2002/0185995 A1* | 12/2002 | Mitamura et al. | 323/282 |
| 2006/0208716 A1 | 9/2006 | Chapuis | |
| 2006/0261794 A1* | 11/2006 | May | 323/283 |
| 2008/0136387 A1 | 6/2008 | Bertele | |
| 2008/0164859 A1* | 7/2008 | Peng et al. | 323/318 |
| 2009/0135033 A1* | 5/2009 | Huppertz | 341/118 |
| 2009/0284998 A1* | 11/2009 | Zhang et al. | 363/55 |
| 2011/0221412 A1 | 9/2011 | Li et al. | |
| 2013/0127530 A1* | 5/2013 | Ni et al. | 330/251 |

OTHER PUBLICATIONS

Welchko, et al.; "Effects and Compensation of Dead-Time and Minimum Pulse-Width Limitations in Two-Level PWM Voltage Source Inverters"; General Motors Advanced Technology Center; Industry Applications Conference, vol. 2; 2006; p. 889-896.

Office Action dated Mar. 11, 2015 in connection with Chinese Patent Application 201310137532.5, pp. 1-14.

\* cited by examiner

DIGITALLY CONTROLLED BUCK-BOOST REGULATOR HAVING A CUSTOM MAPPING CONTROLLER

REFERENCE TO RELATED APPLICATIONS

This application claims priority to U.S. Provisional Patent Application No. 61/636,130, entitled, "Digitally Controlled Buck-Boost Regulator," filed on Apr. 20, 2012, the contents of which are hereby incorporated by reference in its entirety.

BACKGROUND

A buck-boost converter circuit permits the converter to operate in one of three different modes: (1) a buck mode ($V_{OUT} < V_{IN}$), (2) a boost mode ($V_{OUT} > V_{IN}$), and (3) a buck-boost mode ($V_{OUT} \approx V_{IN}$). Such converters may be employed as a voltage regulator in applications where the input voltage may vary over a wide range. Some challenges that exist in such converters is optimizing efficiency over all the operating modes, and transferring between the various mode (i.e., buck/boost/buck-boost) in a seamless fashion, wherein there is little to no impact on the quality of the output voltage.

SUMMARY

In one embodiment of the disclosure, a digitally controlled buck boost regulator comprises an H-bridge circuit comprising a plurality of switches configured to receive an input voltage signal and generate an output voltage signal based on the input voltage signal and switching signals provided thereto. The regulator further comprises a controller configured to generate a pulse width modulation (PWM) control value in response to a value of the output voltage signal, and a quantizer configured to receive the PWM control value and generate a mapped PWM control value, and configured to output the mapped PWM value in response thereto. The regulator further comprises a digital pulse width modulator configured to generate switching signals based on the mapped PWM value, and provide the generated switching signals to the H-bridge circuit.

In another embodiment of the disclosure, a digitally controlled buck boost regulator comprises an H-bridge circuit comprising a plurality of switches configured to receive an input voltage signal and generate an output voltage signal based on the input voltage signal and switching signals provided thereto, and a controller configured to generate a pulse width modulation (PWM) control value in response to a value of the output voltage signal. The regulator further comprises a quantizer configured to receive the PWM control value and generate a first mapping for PWM control values outside a predetermined range of PWM control values, and generate a second, different mapping for PWM control values within the predetermined range, and configured to output a mapped PWM value in response thereto. The regulator further comprises a digital pulse width modulator configured to generate switching signals based on the mapped PWM value, and provide the generated switching signals to the H-bridge circuit.

A method of controlling a buck-boost regulator comprises generating a pulse width modulation (PWM) control value based on a fed back output voltage of the regulator, and determining whether or not the PWM control value is within a predetermined range of values. The method further comprises mapping the PWM control value to a mapped PWM control value based on a first mapping function if the PWM control value is outside the predetermined range of values, and mapping the PWM control value to a mapped PWM control value based on a second, different mapping function if the PWM control value is within the predetermined range of values. The method further comprises calculating a duty cycle and determining whether a buck mode of operation or a boost mode of operation based on the mapped PWM control value.

DETAILED DESCRIPTION

The present disclosure will now be described with reference to the attached drawing figures, wherein like reference numerals are used to refer to like elements throughout, and wherein the illustrated structures and devices are not necessarily drawn to scale.

The present disclosure optimizes efficiency and provides seamless mode switching in a buck-boost converter by eliminating the buck-boost mode of operation and employing a digital control loop with a digital pulse width modulator (PWM) to ensure that the transition from buck to boost mode is seamless. Further, the buck-boost converter of the present disclosure advantageously eliminates the buck-boost mode of operation completely, thus avoiding the operational mode in which all four switches in the H-bridge driver circuit are being dynamically switched.

Figure 1:
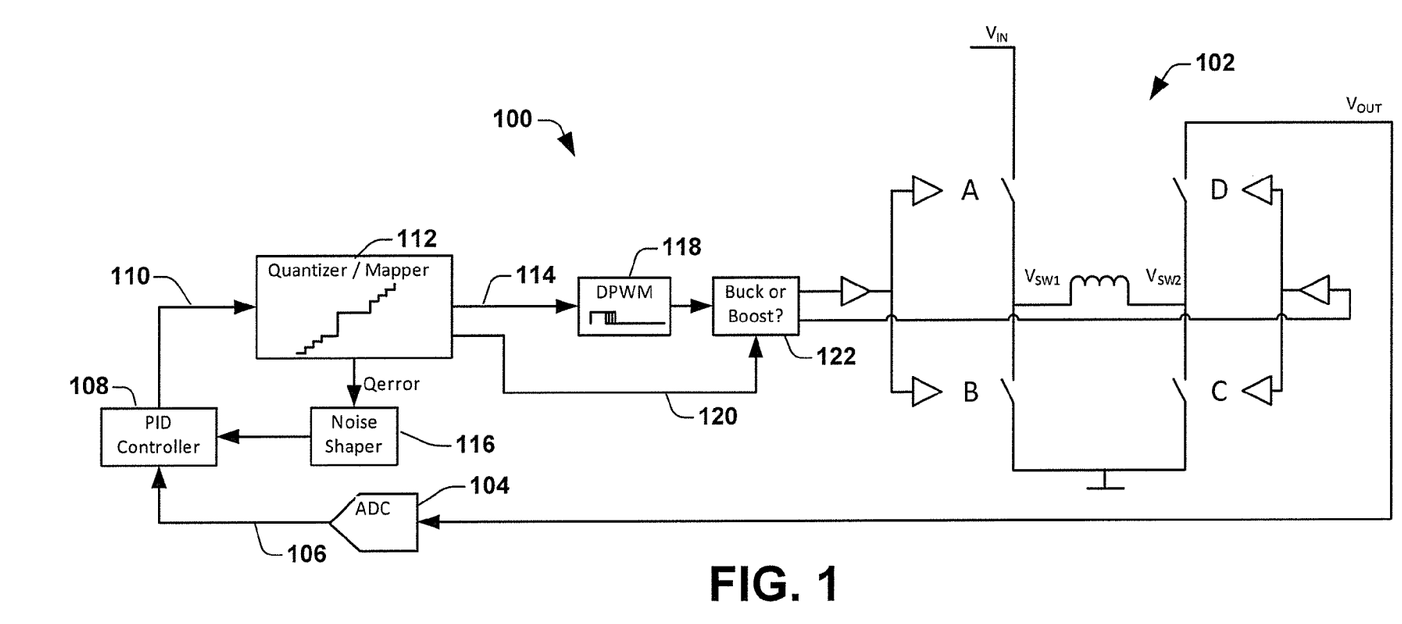
FIG. 1 is a circuit schematic diagram illustrating a digitally controlled buck-boost converter according to one embodiment of the disclosure.
Figure 2A:
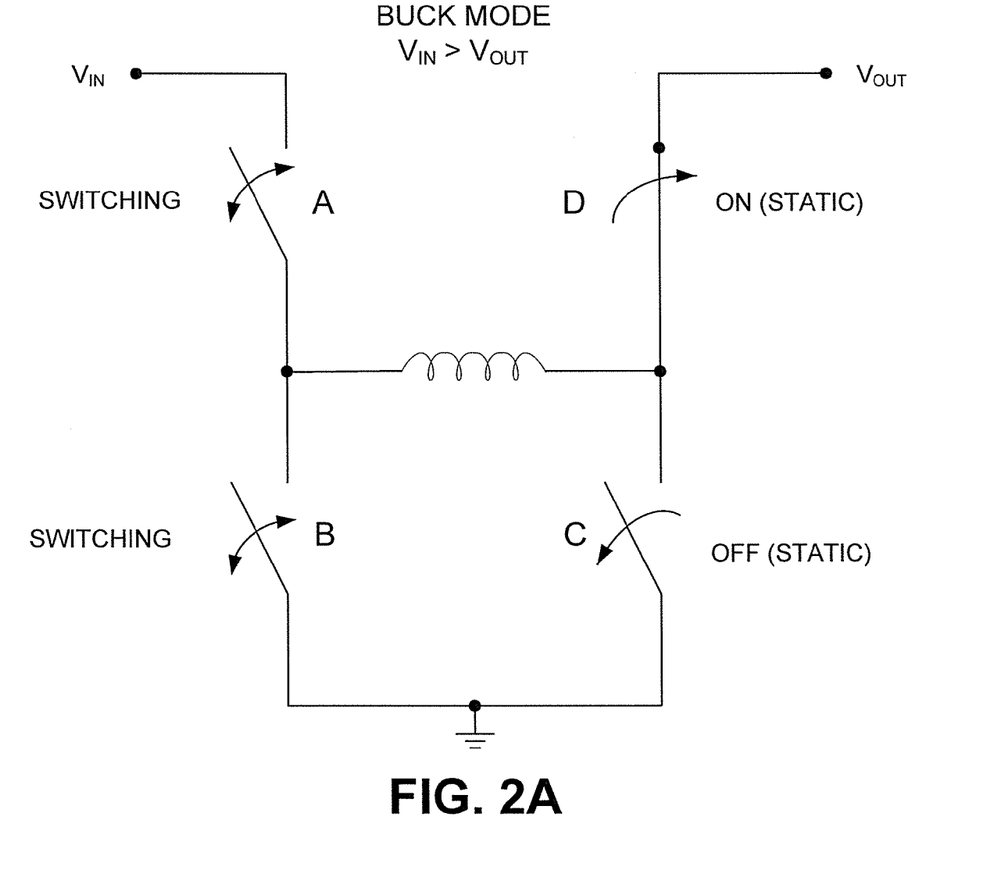
FIGS. 2A-2C are circuit schematic diagrams of the H-bridge circuit of FIG. 1, wherein a switching scheme is illustrated in the buck mode (FIG. 2A), the boost mode (FIG. 2B) and the bypass mode (FIG. 2C), respectively.

FIG. 1 illustrates a DC-DC regulator, such as a buck-boost converter 100 according to one embodiment of the disclosure. The converter 100 includes an H-bridge type driver circuit 102 that includes four switches labeled A, B, C and D in the figure that drive an inductive load, such as a coil. In the buck mode of operation a received input voltage $V_{IN}$ is greater than the output voltage $V_{OUT}$. In such operation, switch C is off (i.e., open) and switch D is on (i.e., closed) in a static manner during the entire buck mode, while switches A and B are switched dynamically per PWM period, as illustrated in FIG. 2A. For a 25% duty cycle, for example, the switch A is closed and switch B is open for 25% of the PWM period, and then they switch and A is open and B is closed for the remaining 75% of the PWM period. During this entire time, the switch C is off while switch D is on.

Figure 2B:
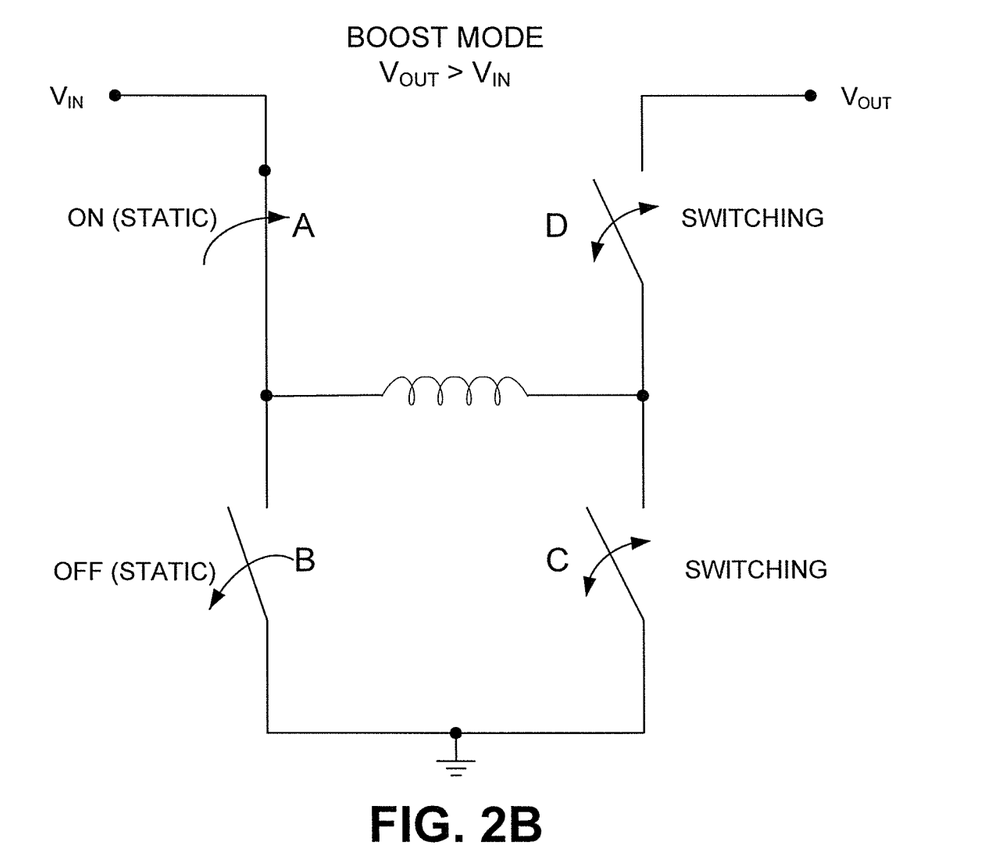

Still referring to the H-bridge driver circuit 102 of FIG. 1, in the boost mode of operation the received input voltage $V_{IN}$ is less than the output voltage $V_{OUT}$. In such operation switch A is on (i.e., closed) and switch B is off (i.e., open) in a static manner during the entire boost mode, while the switches C and D are switched dynamically per PWM period, as illustrated in FIG. 2B. For example, for a 25% duty cycle, the switch C is on the switch D is off for 25% of the PWM period, and then the switch C is off and the switch D is on for the remaining 75% of the PWM period. During this entire time, the switch A is on while the switch B is off.

Figure 2C:
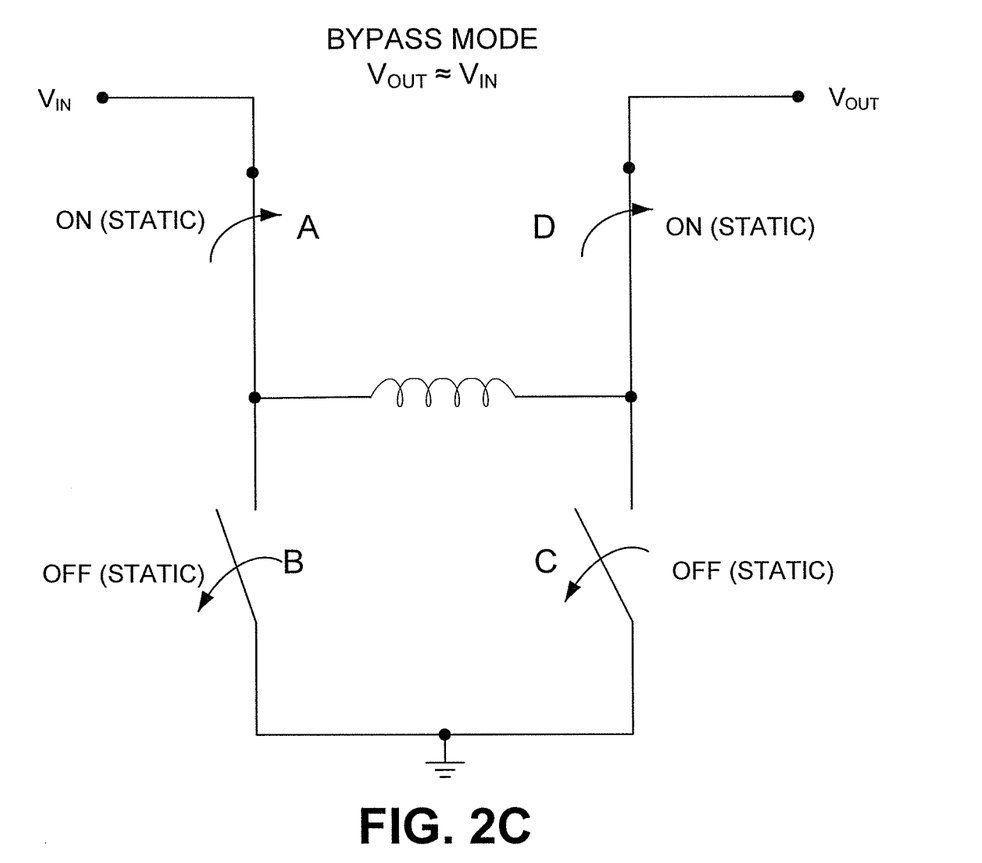

Referring again to FIG. 1, the H-bridge driver circuit 102 may also be driven in an efficient bypass mode that avoids any dynamic switching. In such a bypass mode switches B and C are held statically off, and switches A and D are held statically on, resulting in the input voltage $V_{IN}$ being coupled directly to the output via the coil, as illustrated in FIG. 2C. In such instances the output voltage $V_{OUT}$ approximates the input voltage $V_{IN}$ and because no dynamic switching of switches A, B, C and D is performed, dynamic losses associated therewith are avoided. As will be more fully appreciated below, the present invention maps PWM control values that previously placed the regulator into a buck-boost mode to one or more values that generates the bypass mode, thus avoiding the buck-boost mode of operation entirely.

While FIG. 1 illustrates an H-bridge driver circuit 102 to implement the DC-DC converter, other types of DC-DC converter circuits may be employed, such as a Dickson charge pump and a switched capacitor DC-DC converter. Any circuitry that takes an input voltage and provides an output voltage based thereon in accordance with switching signals provided thereto may be employed and all such variations are contemplated as falling within the scope of the present disclosure.

As shown in FIG. 1, the output voltage $V_{OUT}$ is fed back to an analog-to-digital converter 104 (a digital control loop) to generate a digitized output voltage value 106. A controller 108 receives the digitized output voltage value 106 and generates a PWM control value ($PID_{OUT}$) 110 that is based on $V_{OUT}/V_{IN}$. That is, the controller 108 takes the digitized output voltage value 106 and uses it, along with a digital value of the input voltage $V_{IN}$, to calculate the PWM control value ($PID_{OUT}$) 110. For example, the steady-state (or averaged) PWM control value ($PID_{OUT}$) 110 is calculated in one embodiment as follows:

$V_{OUT}/V_{IN} = (100 - PID_{OUT})/100$, for $PID_{OUT} > 0$ (buck mode), and $V_{OUT}/V_{IN} = 100/(100 + PID_{OUT})$, for $PID_{OUT} < 0$ (boost mode).

For buck mode ($V_{IN} > V_{OUT}$), and thus:
$PID_{OUT} = 100 - 100(V_{OUT}/V_{IN})$, thus $PID_{OUT} > 0$ for buck mode, and For boost mode ($V_{OUT} > V_{IN}$) and thus:
$PID_{OUT} = 100(V_{IN}/V_{OUT}) - 100$, thus $PID_{OUT} < 0$ for boost mode.

It should be appreciated that in one embodiment of the disclosure, the controller 108 comprises a PID (proportional-integral-derivative) controller or a PI controller. In such context, the above calculations are not actually performed, but instead the output voltage $V_{OUT}$ is fed back and an error signal is generated in response thereto, and the PID controller 108 executes a control algorithm to minimize the error. However, in the steady-state context the $PID_{OUT}$ values will approximate the above equations which are provided to aid in appreciating the control of the present disclosure. In addition, while a PID or PI controller is provided as one example, it should be understood that any type of controller or control algorithm may be employed and such alternatives are contemplated as falling within the scope of the present disclosure. Further, a look-up table (LUT) type solution may be utilized, wherein for a given $V_{OUT}$ value, a particular $PID_{OUT}$ value is selected from the look-up table.

The calculated PWM control value ($PID_{OUT}$) 110 is then provided to a quantizer/mapper circuit 112 that outputs a PWM control value 114 (that represents a desired duty cycle). This value constitutes a mapping of the PWM control value ($PID_{OUT}$) 110 to control values that avoid a buck-boost mode of operation. For example, the quantizer/mapper circuit 112 passes the $PID_{OUT}$ value 110 for values of $PID_{OUT}$ that lie outside a predetermined range of values. In one example, the range of values is: $-10 < X < 10$. Thus for values less than $-10$ and greater than 10, the $PID_{OUT}$ value is passed along and a duty cycle is calculated therefrom. Further, for values of $PID_{OUT}$ that fall within the predetermined range, the $PID_{OUT}$ value is mapped as follows in one embodiment:

$-10 < PID_{OUT} < -5$, then $PID_{OUT}$ forced to $= -10$
$-5 < PID_{OUT} < 5$, then $PID_{OUT}$ forced to $= 0$
$5 < PID_{OUT} < 10$, then $PID_{OUT}$ forced to $= 10$.

As can be seen in the above equations for mapped $PID_{OUT}$, for a buck-boost mode of operation ($V_{IN} \approx V_{OUT}$), $PID_{OUT}$ is near zero. Thus for small values of $PID_{OUT}$ close to zero, to avoid operation in buck-boost mode (i.e., where the duty cycle will be close to 100%, but is not and where switching is inefficient since the remaining percentage is consumed entirely by the dynamic nature of the switching) a mapping is used that forces the converter into a bypass mode. In such cases, it is more efficient to simply not perform any switching at all and keep the duty cycle at 100%. As can be appreciated in such case, the switches A and D are continuously closed, and the switches B and C are continuously open and the H-bridge driver circuit 102 operates in a continuous bypass mode.

Therefore the quanitizer/mapper 112 takes $PID_{OUT}$ values 110 that are close to zero that cause sub-optimal efficiency, and force such values to zero to operate in a bypass mode. Further, $PID_{OUT}$ values 110 that are also within the predetermined range, but further away from zero are forced to the range edge, respectively. Thus $PID_{OUT}$ values 110 between $-5$ and $-10$ are forced to $-10$ (the negative range edge) while $PID_{OUT}$ values 110 between 5 and 10 are forced to 10 (the positive range edge) in one embodiment. Therefore the only value permitted between $-10$ and 10 is zero. While the present embodiment utilizes the range $-10 < X < 10$, it should be understood that this range can be expanded or contracted as desired, wherein the size of the mapping range reflects a design trade off, since a wider range improves efficiency at the cost of a time-domain ripple.

Still referring to the converter 100 of FIG. 1, a noise shaper block 116 receives a quantization error (Qerror) from the quantizer/mapper 112. For example, if the PIDOUT 110 value passed to the quantizer/mapper 112 was a value of $-6$, the quantizer/mapper 112 forces this value to $-10$, thus introducing a quantization error of 4. This value (Qerror) is passed to the noise shaper 116 which passes the information to the controller 108 for future calculations. With a first order type noise shaper, the block 116 simply passes the quantization error to the controller 108. Alternatively, with a second or higher order noise shaper, the block 116 may calculate a correction factor that is a function of the present quantization error as well as that of a previous quantization error. Further, the noise shaper 116 may utilize further shaping using other factors, and such alternatives are contemplating as falling within the scope of the present disclosure. In one example of how the quantization error can be utilized to modify a PWM control value, if the next $PID_{OUT}$ value was again $-6$, the controller 108 adds the previous quantization error of 4 to that value to obtain the value $-2$. Since this "corrected value" is between $-5$ and 5, it gets forced to zero by the quantizer/mapper 112 and a quantization error (Qerror) of $-2$ is calculated. This value will then get added to the next value of $PID_{OUT}$ at the controller 108 and so on.

The quantizer/mapper 112 also operates to map the negative values of $PID_{OUT}$ (boost mode values) to positive values that can be properly interpreted by the downstream digital pulse width modulator (PWM) 118. We know that $V_{OUT}/$ $V_{IN}$=D (duty cycle) for the buck mode, and that $V_{OUT}/V_{IN}$=1/(1−D) in the boost mode. Using the $PID_{OUT}$ equations provided earlier, we can calculate the duty cycle in the mapper 112 in terms of $PID_{OUT}$, wherein D=(100−$PID_{OUT}$)/100, for buck mode, $PID_{OUT}$>0, and
D=1−((100+$PID_{OUT}$)/100) for boost mode, $PID_{OUT}$<0.

In addition, the quantizer/mapper 112 indicates via a mode signal 120 to a buck or boost block 122 so that the block 122 knows which switches to operate dynamically. For example, if the DPWM 118 receives a duty cycle value 114 of 20% from the quantizer/mapper 112, the DPWM 118 generates a signal in which 20% of the PWM period the signal is "high" and 80% of the PWM period the signal is "low." If the $PID_{OUT}$ value was positive, the quantizer/mapper 112 outputs a first state on line 120 that indicates a buck mode, and thus the 20% duty cycle signal from the DPWM 118 is provided to switch A and B (A on for 20%, B off for 20%, then A off for 80% and B on for 80%) while C is held off and D is held on statically for the entire PWM period. Alternatively, if the quantizer/mapper 112 outputs a second state on line 120 that indicates a boost mode ($PID_{OUT}$ was negative), then the 20% duty cycle signal is provided to switches C and D (C on for 20%, D off for 20%, then C off for 80% and D on for 80%), while A is held on and B is held off statically for the entire PWM period.

Figure 3:
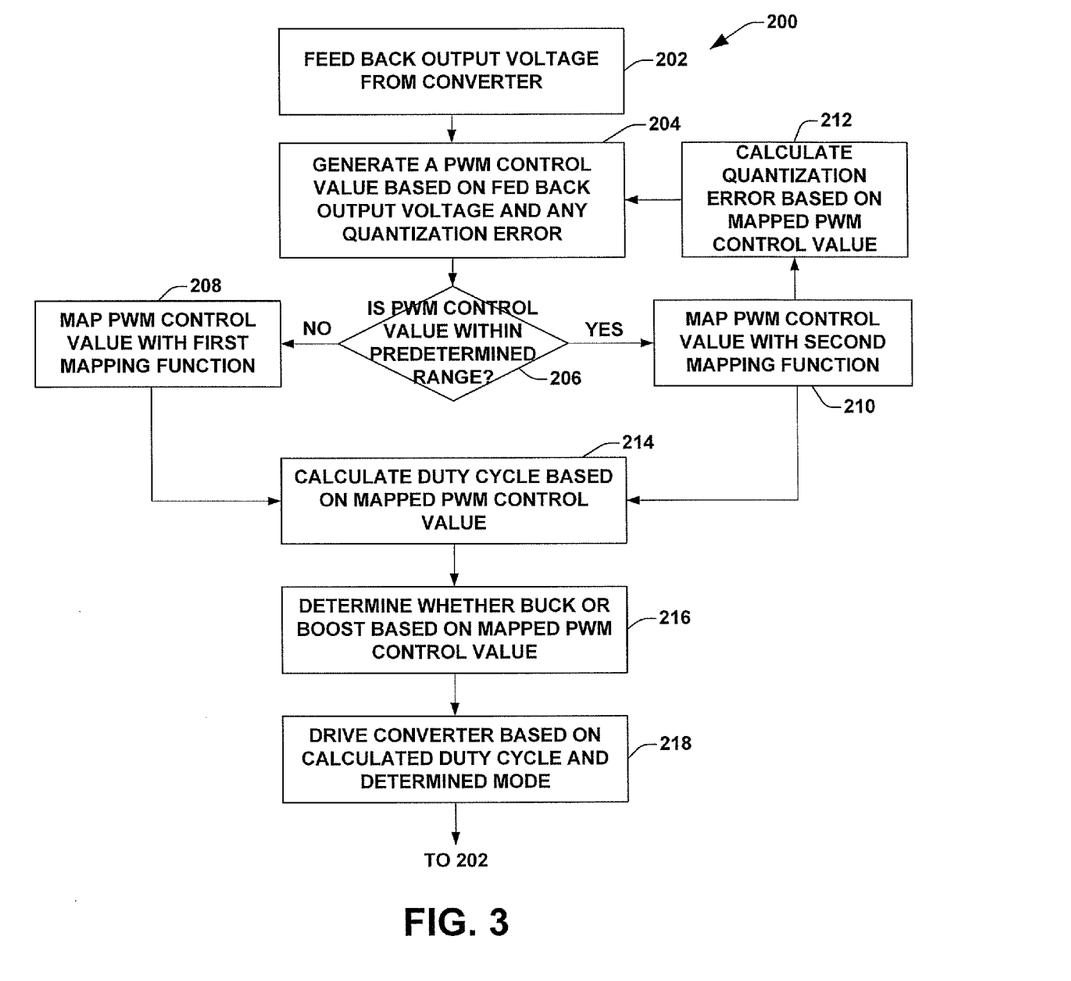
FIG. 3 is a flow chart diagram illustrating a method of digitally controlling a buck-boost converter according to another embodiment of the disclosure.

A method of controlling a buck-boost regulator is illustrated in FIG. 3. While the method 200 is illustrated and described below as a series of acts or events, it will be appreciated that the present disclosure is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present disclosure.

The method 200 begins at 202 by feeding back an output voltage $V_{OUT}$ of the buck-boost regulator. In one non-limiting embodiment such feedback is from an H-bridge driver circuit such as the converter 102 of FIG. 1. At 204 a PWM control value is generated based on the fed back output voltage $V_{OUT}$. In one embodiment the PWM control value may comprise value 110 output from the controller 108 in FIG. 1. In one embodiment the PWM control value is based on the output voltage $V_{OUT}$ and the input voltage $V_{IN}$, wherein a ratio thereof indicates whether the converter is operating in a buck mode or a boost mode. In one non-limiting embodiment the PWM control value may comprise $PID_{OUT}$ 110 of FIG. 1, which may be characterized in a steady-state fashion as approximated by:

$PID_{OUT}$=100−100($V_{OUT}/V_{IN}$), for buck mode, and
$PID_{OUT}$=100($V_{IN}/V_{OUT}$)−100, for boost mode.

As highlighted above for FIG. 1, the method 200 may use a PID type controller that ascertains an error signal from the fed back $V_{OUT}$ and employs a control algorithm that aims to minimize the error signal. The above equations simply characterize what such values may look like if the regulator is operating in a steady state type fashion. In a dynamic mode the values may vary.

Still referring to the method 200 of FIG. 3, a query is made at 206 whether the PWM control value falls within a predetermined range of value. In one embodiment the predetermined range of values is selected to preclude inefficient operating modes of the regulator, for example, by avoiding a duty cycle in the 95-99% range. If the PWM control value does not fall within the range (NO at 206), the PWM control value is mapped with a first mapping function at 208. In one example, the first mapping function is a unit function, wherein the PWM control value stays the same, wherein a value of 40, for example, is mapped to a mapped PWM control value of 40, or a value of −30 is mapped to a mapped PWM control value of −30. Referring back to the query 206, if the PWM control value does fall within the predetermined range of values (YES at 206), the method 200 proceeds to 210, wherein the PWM control value is mapped with a second mapping function that differs from the first mapping function. In one example, the second mapping function takes values between −10<X<10, and maps them as follows:

−10<$PID_{OUT}$<−5, $PID_{OUT}$ is forced to −10,
−5<$PID_{OUT}$<5, $PID_{OUT}$ is forced to 0, and
5<$PID_{OUT}$<10, $PID_{OUT}$ is forced to 10.

In such instances it can be seen that the second mapping function forces a PWM control value to either zero or a value at the edge of the range. IN such instances a quantization error occurs and such error is calculated at 212. For example, if the PWM control value was −8, the second mapping function maps the value to −10, and a quantization error of 2 is calculated at 212. The quantization error is fed back to step 204 so that a next PWM control value being generated takes the calculated quantization error into account. For example, if the next PWM control value is −6, the quantization error of 2 may be used to adjust the value to −4, and thus the second mapping function at 210 will then force this value to zero, resulting in a new quantization error of −4 at 212. Thus this value can be added to the next generated PWM control value, or used in some fashion to alter the next generated PWM control value at 204, and so on.

The method 200 continues at 214 by taking the mapped PWM control value (whether from the first mapping function at 208 or the second mapping function at 210), and calculating the duty cycle based on the mapped PWM control value. In one embodiment the mapped PWM control value may be a mapped $PID_{OUT}$ value from a quantizer/mapper 112 as shown in FIG. 1, and a duty cycle may be calculated as:

D=(100−$PID_{OUT}$)/100, for buck mode, $PID_{OUT}$>0, and
D=1−((100+$PID_{OUT}$)/100), for boost mode, $PID_{OUT}$<0.

In addition, the method 200 determines whether a buck or boost mode is to be employed in the regulator at 216. In one embodiment, the determination is made using a sign (e.g., positive or negative) of the mapped PWM control value. In one example, as highlighted above, for a negative value of the mapped PWM control value a determination is made to switch in the boost mode, while if the mapped value is positive a determination is made at 216 to use buck mode switching.

The method 200 of FIG. 3 then concludes at 218, wherein the H-bridge driver circuit is driven with the selected duty cycle and with the determined buck or boost mode switching scheme. The method 200 may further continue, if desired, by feeding the resultant output voltage $V_{OUT}$ resulting from the calculated duty cycle and switching scheme at the H-bridge driver circuit back to 202 and repeating.

While FIG. 1 herein illustrates a digital DC-DC converter solution that employs at least two different types of mapping utilizing a quantizer/mapper 112, in another embodiment, the quantizer/mapper 112 may be eliminated, in which case the controller 108 generates the PWM control value 110, and provides the control value directly to the digital PWM 118, which then generates switching signals of the appropriate duty cycle based on the PWM control value 110. In this instance, since no mapping is performed, a mode signal 120 is not employed and thus the block 122 is no longer necessary. Thus, the digital PWM 118 provides switching signals directly to the DC-DC converter, such as the H-bridge circuit 102. Further, since no mapping is performed, the digital PWM 118 will generate switching signals in which all modes are available; that is, the buck mode, the boost mode, and the buck/boost mode, where all four switches are dynamically switched. In the above manner, a digitally controlled converter circuit is implemented, in particular, a digitally controlled buck-boost type regulator.

Figure 4:
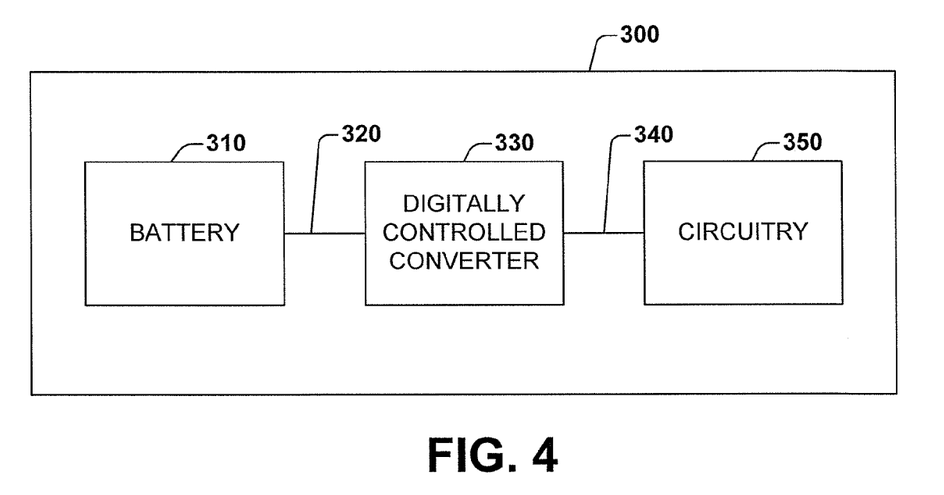
FIG. 4 is a block level diagram illustrating a portable device employing a digitally controlled regulator in accordance with an embodiment of the disclosure.

FIG. 4 illustrates a system level diagram in which the regulator is employed in a high level system. In this non-limiting example, a portable device 300, for example, a mobile phone, personal digital assistant, tablet or laptop device, has a battery 310 which provides a battery voltage 320, which can vary over time. A digitally controlled regulator 330, such as that illustrated in FIG. 1 herein, receives the battery voltage 320, and provides a regulated voltage 340 at an output thereof. The regulated voltage 340 is then provided to one or more subcircuits 350 within the portable device 300.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A digitally controlled regulator, comprising:
   a DC-DC converter circuit configured to receive an input voltage signal and generate an output voltage signal based on the input voltage signal and switching signals provided thereto;
   a controller configured to generate a pulse width modulation (PWM) control value in response to a value of the output voltage signal;
   a quantizer configured to receive the PWM control value and generate a first mapping that maps all the PWM control values that fall between a first threshold value and a second threshold value to a first single mapped PWM value, and generate a second, different mapping that passes the received PWM control values that are less than a third threshold value or greater than a fourth threshold value as mapped PWM values in a one-to-one correspondence fashion, wherein the first threshold value is less than the second threshold value, the third threshold value is less than the first threshold value and the fourth threshold value is greater than the second threshold value; and
   a digital pulse width modulator configured to generate switching signals based on the mapped PWM value, and provide the generated switching signals to the DC-DC converter circuit.

2. The digitally controlled regulator of claim 1, wherein the quantizer is further configured to generate a third mapping that maps all the PWM control values less than the first threshold value, and greater than the third threshold value to a second single mapped value, and generate a fourth mapping that maps all the PWM control values greater than the second threshold value, and less than the fourth threshold value to a third single mapped value, wherein the first single mapped value, the second single mapped value, and the third single mapped value are different from one another.

3. The digitally controlled regulator of claim 1, wherein the first threshold value and the second threshold value are symmetric about zero and have the same absolute value.

4. The digitally controlled regulator of claim 1, wherein the DC-DC converter circuit comprises an H-bridge circuit comprising a plurality of switches configured to receive the switching signals, and wherein the digital pulse width modulator is configured to generate the switching signals that are static upon receipt of the first single mapped PWM value, to place the H-bridge circuit into a bypass mode, wherein the output voltage signal is substantially equal to the input voltage signal.

5. The digitally controlled regulator of claim 4, wherein the H-bridge circuit comprises:
   a first switch element coupled between an input voltage node and a first load node;
   a second switch element coupled between the first load node and a reference potential node;
   a third switch element coupled between an output voltage node and a second load node;
   a fourth switch element coupled between the second load node and the reference potential node,
   wherein a load is configured to be coupled between the first and second load nodes, and
   wherein the first switch element and the third switch element are statically closed, and the second switch element and the fourth switch element are statically open in the bypass mode, to couple the input voltage node to the output voltage node through the load.

6. The digitally controlled regulator of claim 1, wherein for PWM control values less than the first threshold value, the quantizer is further configured to output a mode signal state indicative of a boost mode, and wherein for PWM control values greater than the second threshold value, the quantizer is configured to output a mode signal state indicative of a buck mode.

7. The digitally controlled regulator of claim 2, further comprising a noise shaper circuit configured to receive an error signal from the quantizer having a magnitude and sign corresponding to the mapping of a received PWM control value to one of the first, second or third single mapped PWM values, and configured to generate a compensation signal based on one of the first, second or third single mapped PWM values, and provide the compensation signal to the controller.

8. The digitally controlled regulator of claim 7, wherein the controller is further configured to employ the compensation signal from the noise shaper circuit along with the value of the output voltage signal to generate the PWM control value.

9. A digitally controlled regulator, comprising:
   a DC-DC converter circuit configured to receive an input voltage signal and generate an output voltage signal based on the input voltage signal and switching signals provided thereto;
   a controller configured to generate a pulse width modulation (PWM) control value in response to a value of the output voltage signal;
   a quantizer configured to receive the PWM control value and generate a first mapping for PWM control values outside a predetermined range of PWM control values, and generate a second, different mapping for PWM control values within the predetermined range, and configured to output a mapped PWM value in response thereto, wherein the second mapping comprises assigning the PWM control values within the predetermined range to one of three different mapped PWM values based on where a given PWM control falls within the predetermined range;

a digital pulse width modulator configured to generate switching signals based on the mapped PWM value, and provide the generated switching signals to the DC-DC converter circuit, wherein the DC-DC converter circuit comprises an H-bridge circuit comprising a plurality of switches configured to receive the switching signals, and wherein the digital pulse width modulator is configured to generate the switching signals that are static upon receipt of a particular one of the three mapped PWM values, thereby placing the H-bridge circuit into a bypass mode, wherein the output voltage signal is substantially equal to the input voltage signal; and a noise shaper circuit configured to receive an error signal from the quantizer having a magnitude and sign corresponding to the mapping of a received PWM control value to one of the three mapped PWM values, and configured to generate a compensation signal based thereon and provide the compensation signal to the controller, wherein the controller is further configured to employ the compensation signal from the noise shaper circuit along with the value of the output voltage signal to generate the PWM control value.

10. The digitally controlled regulator of claim 9, wherein the first mapping passes the received PWM control values to the digital pulse width modulator as mapped PWM values in a one-to-one correspondence fashion.

11. The digitally controlled regulator of claim 9, wherein the second mapping comprises assigning all the PWM control values within the predetermined range to a single mapped PWM value.

12. The digitally controlled regulator of claim 9, wherein the H-bridge circuit comprises:

a first switch element coupled between an input voltage node and a first load node;

a second switch element coupled between the first load node and a reference potential node;

a third switch element coupled between an output voltage node and a second load node;

a fourth switch element coupled between the second load node and the reference potential node, wherein a load is configured to be coupled between the first and second load nodes, and wherein the first switch element and the third switch element are statically closed, and the second switch element and the fourth switch element are statically open in the bypass mode, thereby coupling the input voltage node to the output voltage node through the load.

13. The digitally controlled regulator of claim 9, wherein the predetermined range is bounded by a first threshold value and a second threshold value, and wherein for PWM control values less than the first threshold, the quantizer is further configured to output a mode signal state indicative of a boost mode, and wherein for PWM control values greater than the second threshold the quantizer is configured to output a mode signal state indicative of a buck mode.

14. A method of controlling a digitally controlled regulator, comprising:

generating a pulse width modulation (PWM) control value based on a feedback output voltage of the regulator;

determining whether or not the PWM control value is within a predetermined range of values;

mapping the PWM control value to a mapped PWM control value based on a first mapping function if the PWM control value is outside the predetermined range of values;

mapping the PWM control value to a mapped PWM control value based on a second different mapping function if the PWM control value is within the predetermined range of values, wherein the second, different mapping function maps at least some of the PWM control values within the predetermined range of values to a single mapped PWM control value;

calculating a duty cycle and determining whether a buck mode of operation or a boost mode of operation based on the mapped PWM control value; and skipping the calculating of the duty cycle if the PWM control value is within the predetermined range of values and is mapped to the single mapped PWM control value; and determining a bypass mode of operation based on the single mapped PWM control value, wherein the output voltage of the regulator is approximately equal to an input voltage of the regulator.

* * * * *